Nov. 18, 1969  O. HENDRICKSON  3,478,786
ADJUSTABLY CONTROLLED SABER SAW
Filed Feb. 3, 1967  3 Sheets-Sheet 1

Otto Hendrickson
INVENTOR.

BY *Clarence A. O'Brien*
and *Harvey B. Jacobson*
Attorneys

Otto Hendrickson
INVENTOR.

Nov. 18, 1969  O. HENDRICKSON  3,478,786
ADJUSTABLY CONTROLLED SABER SAW
Filed Feb. 3, 1967  3 Sheets-Sheet 3

Otto Hendrickson
INVENTOR.

BY *Clarence A. O'Brien*
and *Harvey B. Jacobson*
Attorneys

United States Patent Office 3,478,786
Patented Nov. 18, 1969

3,478,786
ADJUSTABLY CONTROLLED SABER SAW
Otto Hendrickson, P.O. Box 5316, Canyon Crest Station, Riverside, Calif. 92507
Filed Feb. 3, 1967, Ser. No. 613,842
Int. Cl. B27b 19/08
U.S. Cl. 143—68
7 Claims

ABSTRACT OF THE DISCLOSURE

A saber saw having a lower foot which is adjustable to the thickness of the material being cut so that the saw will not jump out of the cut inasmuch as the foot traveling under the cut through the material will hold the material steady while the saw is moving back up through the cut for another cutting stroke thus keeping the material being cut from bouncing away from the saw when the saw re-enters the cut. The saber saw with the adjustable lower foot also employs a foot which turns with the saw as the saw forms the cut with the foot being rounded to enable it to move in either direction and follow the cut in either direction so that the saw may be backed out of the cut if desired. The structure of the saw also includes a pump arrangement to blow dust away from the saw to enable easier observation of a guide line so that a more accurate cut can be made.

---

The present invention generally relates to a saber saw of the power-operated type which has a reciprocating blade capable of cutting material of various types and more specifically includes such a saw having an adjustably mounted lower foot which extends below the material and engages the undersurface of the material being cut to enable various thicknesses of material to be cut and to provide a support for the material being cut to prevent material from bouncing away from the saw blade during its reciprocal movement.

An object of the present invention is to provide a saber saw having a reciprocating blade and an adjustable lower foot disposed below the material being cut and engaging the undersurface of such material on both sides of the cut to effectively support the material to prevent the material from bouncing away from the saw during the cutting operation thereby holding the material steady so that the cutting operation will be constant and a smoother and more accurate cut will be formed.

Another object of the present invention is to provide a saber saw which includes an adjustable lower foot disposed under the material being cut together with a top shoe opposed thereto for steadying the saw which is angularly adjustable and settable to orientate the saw blade in a predetermined angular relation to the surface of the material being cut.

A further object of the present invention is to provide a saber saw in accordance with the preceding object in which the structure of the reciprocating saw includes a pneumatic pump structure which will serve to blow away dust or material cut by the saw so that a guide line may be more readily observed.

Still another object of the present invention is to provide a saber saw having a lower foot disposed under the material being cut which has the forward and rear edges thereof curved downwardly to facilitate turning movement of the blade and foot and also to enable the lower foot to move in either direction without hanging against the material thus enabling the saw blade to back out of the cut if so desired.

Still another important object of the present invention is to provide a saber saw having a lower foot disposed under the material being cut and an upper foot engaging the upper surface of the material being cut and a shoe engaging the upper surface of the material being cut to form a steady support for the saw in relation to the material being cut with the shoe having a cutout area to enable passage of the saw and also to enable the upper foot to engage the material being cut.

Still another important feature of the present invention is to provide a saber saw which is relatively simple in construction, efficient in operation, and relatively inexpensive in construction.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
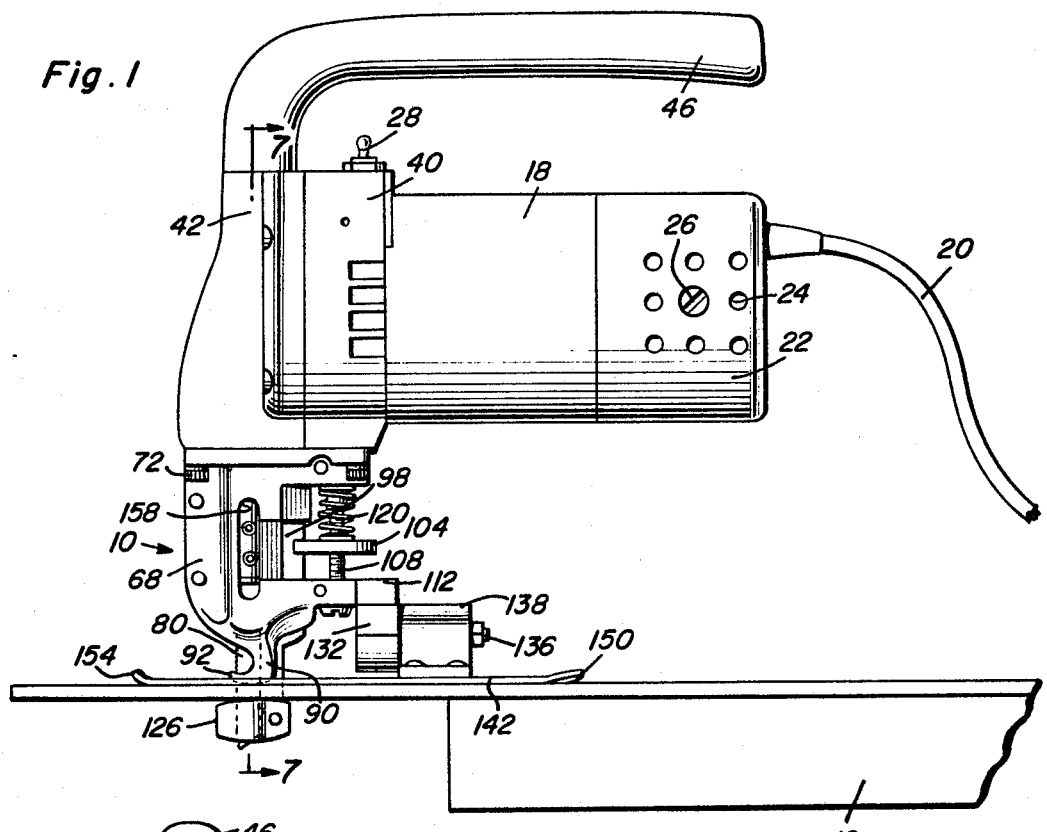
FIGURE 1 is a side elevational view of the saber saw of the present invention.
Figure 2:
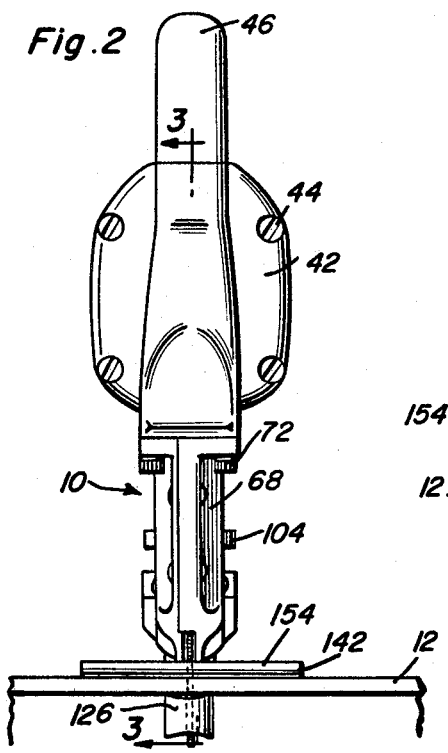
FIGURE 2 is an end view of the construction of FIGURE 1.
Figure 5:
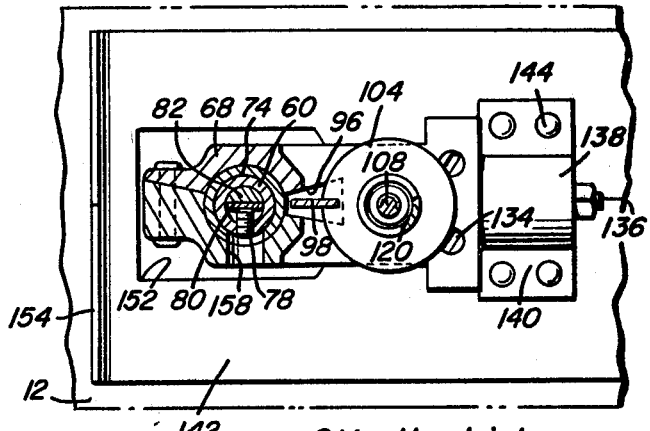
FIGURE 5 is a detailed sectional view taken substantially upon a plane passing along section line 5—5 of FIGURE 3 illustrating the structure details of the blade mounting and adjustment mechanism.

Referring now specifically to the drawings, the saber saw of the present invention is generally designated by the reference numeral 10 and is illustrated in cutting material 12 by forming a kerf or saw cut 14 therein with the material 12 being supported on any suitable type of supporting structure 16 adequate to support the material 12 being cut.

The saber saw 10 includes a motor assembly 18 which may be an electric motor, a pneumatic motor, hydraulic motor or any other suitable type of power mechanism. Considering the motor 18 to be an electric motor, an electrical conductor 20 having a male plug (not shown) thereon is provided for supplying electrical energy to the motor. The motor 18 may be provided with a removable end cap 22 having vent apertures 24 therein and a retaining screw 26 all of which represents conventional construction and a suitable switch 28 may be provided for controlling operation of the motor 18. The motor 18 has an output gear 30 driving a large spur gear 32 or the like journalled by the use of a central stub shaft 34 received in a bearing sleeve 36 or the like. A lubrication hole or suitable fitting 38 is provided for the bearing sleeve 36 and a lubricant absorbing wick or the like may be provided in the lubrication passage 38 to lubricate the relative rotation of the shaft 34 in the bearing sleeve 36.

The gears 30 and 34 are received within a housing 40 and attached to the housing 40 is a housing member or cap 42 which may be secured in place by suitable fasteners 44. Attached to the upper surface of the cap 42 is an elongated handle 46 generally paralleling the motor 18 with the forward end thereof downturned secured to the housing top 42 by a suitable fastening assembly 48.

Disposed in the housing cap 42 is a connecting rod 50 which has the upper end thereof journalled on and mounted on an eccentric pin 52 carried by the gear 32. The lower end of the connecting rod 50 is journalled on and mounted on a headed fastening bolt 54 which extends through and is threaded into a slide block 56 which reciprocates vertically due to the motion imparted thereto by the connecting rod 50, the upper end of which moves in a circular path about the center of the shaft 34 and the lower end moving in a vertical path while oscillating on the fastening bolt 54 thereby reciprocating the slide block 56 in a vertical hollow passage 58 in the housing cap 42.

The slide block 56 receives a tubular actuator or plunger 60 which extends up through a passageway 62 in the slide block 56 and the upper end of the tubular actuator 60 is provided with a solid plug 64 through which the fastener 54 extends thereby reinforcing the tubular plunger 60. The plunger 60 extends down through an aperture 66 in the bottom of the housing cap 42 and is driven in a reciprocating manner when the motor 18 is actuated.

Figure 7:
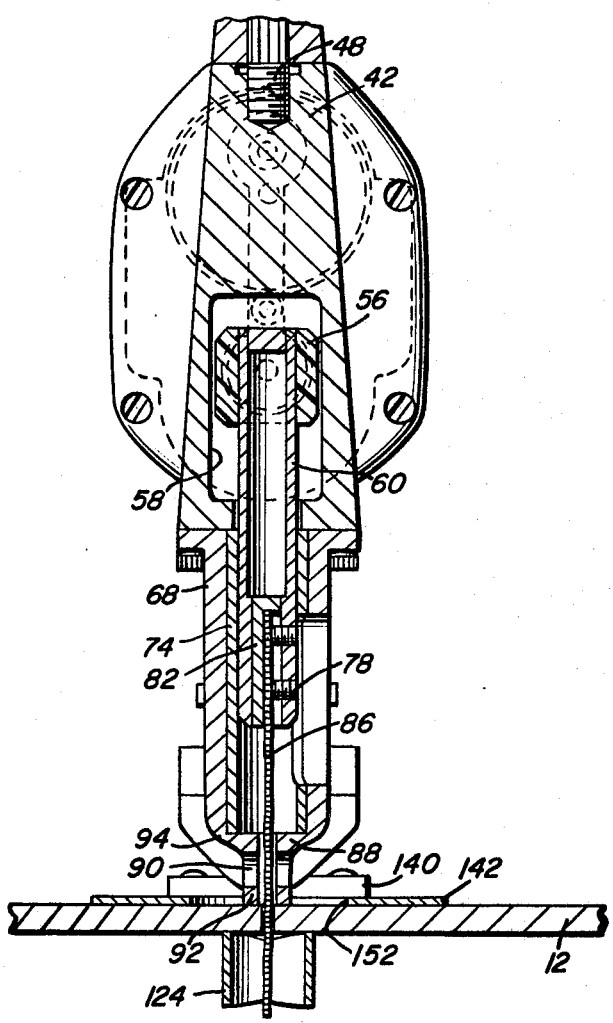
FIGURE 7 is a vertical sectional view taken substantially upon a plane passing along section line 7—7 of FIGURE 1 illustrating further structural details of the blade structure and the relationship of the upper shoe, lower shoe and foot.
Figure 8:
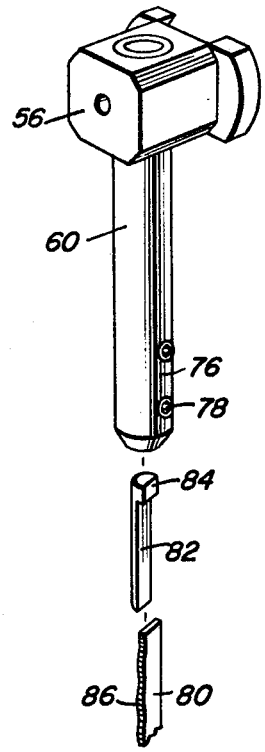
FIGURE 8 is a perspective view illustrating the blade, the blade adapter and the blade actuator.

Attached to the undersurface of the housing cap 42 is a housing or body 68 which is longitudinally constructed in two assembled parts secured together by a fastening bolt 70 with the upper end of the body 68 being attached to the housing cap 42 by suitable fasteners 72. The body 68 includes a tubular member 74 in alignment with the opening 66 for receiving the tubular actuator 60 so that the tubular actuator 60 operates substantially in the form of a plunger or piston and the sleeve 74 acts as a cylinder therefor. The lower end portion of the actuator, designated by numeral 76 has a thicker wall than the upper portion thereof which is hollow for weight reduction and is provided with a pair of setscrews 78 which secure the upper end of a reciprocating saw blade 80 to the actuator 60. A semi-cylindrical adapter 82 is provided for filling the area between the flat saw blade 80 and one side of the tubular actuator 66 and the upper end of the adapter 82 is provided with a projection 84 which overlies the upper edge of the saw blade 80 and the second portion of the lower end 76 of the actuator 60 as illustrated in FIGURE 7. This insert 82 serves to keep the saw 80 in a straight condition with the cutting edge 86 of the saw blade 80 centrally disposed in relation to the actuator 60 and the sleeve 74.

Figure 3:
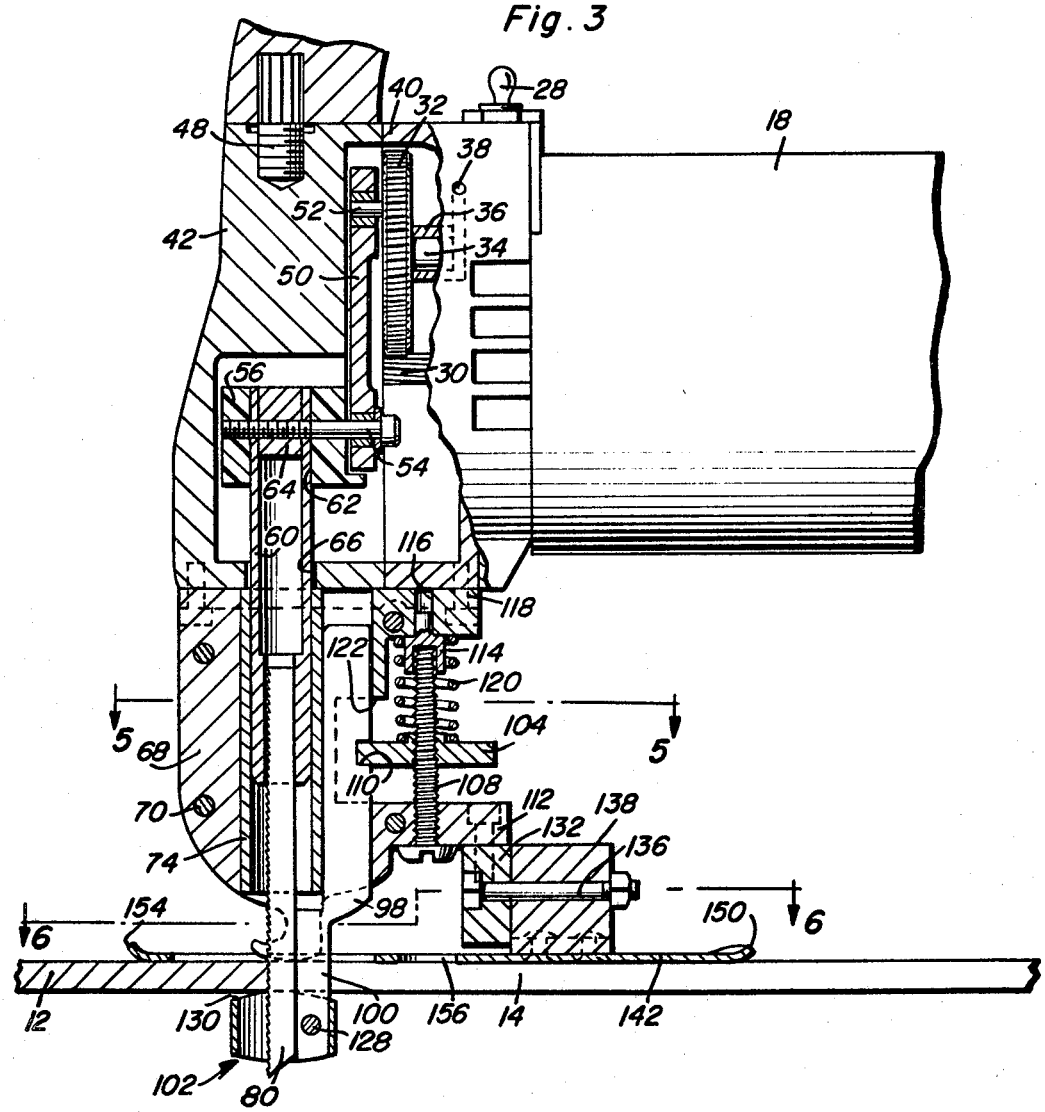
FIGURE 3 is a vertical sectional view taken substantially upon a plane passing along section line 3—3 of FIGURE 2 illustrating the structural details of the saber saw.
Figure 4:
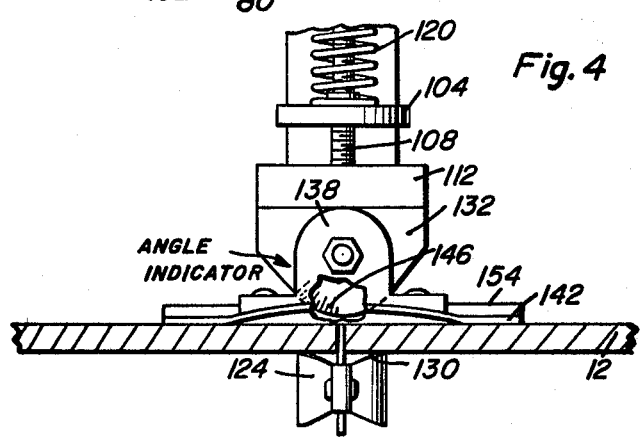
FIGURE 4 is a detailed rear elevational view with portions thereof broken away to illustrate the angle indicator construction.

The lower end of the body 68 has an inwardly extending portion 88 terminating in a downwardly extending neck 90. Each of the necks 90 terminates in a shoe 92 which has a rounded lower edge with the forward and rear ends thereof curved upwardly with the shoes 92 adapted to engage the upper surface of the material 12 being cut as illustrated in FIGURES 1, 3 and 7. The inwardly extending portions 88 of the body 58 form a closure for the lower end of the sleeve 74 except for the vertical slot-like opening 94 extending therethrough.

Figure 6:
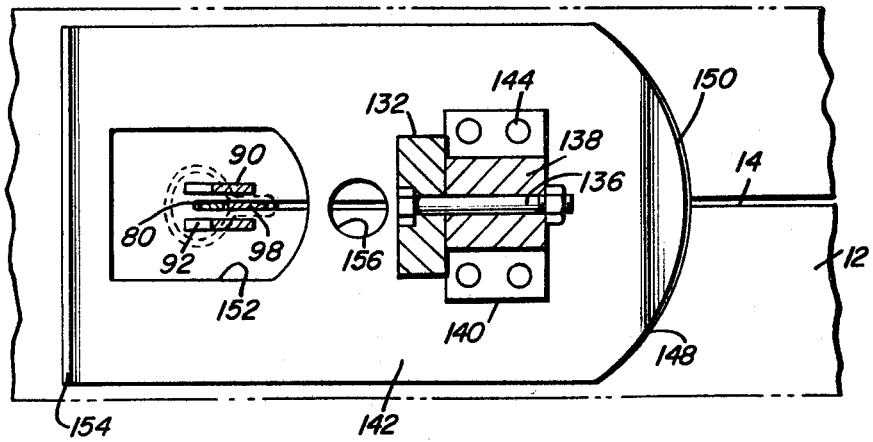
FIGURE 6 is a detailed sectional view taken substantially upon a plane passing along section line 6—6 of FIGURE 3 illustrating further structural details of the blade construction, the upper foot and the mounting structure for the shoe.

Also, the body 68 is provided with a vertically disposed hollow area or passageway 96 disposed in alignment with and rearwardly of the sleeve 74. The vertical passage or hollow area 96 receives a vertically disposed mounting plate 98 which has the lower end thereof all set forwardly as at 100 and the offset portion 100 supports a lower foot generally designated by the numeral 102. The offset portion 100 of the supporting plate 98 slides vertically between the shoes 92 and the neck 90 and immediately rearwardly of the blade 80 as illustrated in FIGURE 6. Thus, the offset portion 100 will follow the blade 80 in the kerf or cut 14 in the material 12.

For retaining the mounting plate 98 in position in the bore or passageway 96, there is provided a circular hand wheel 104 screwthreadedly mounted on a vertical threaded shaft 108 with the periphery of the hand wheel 104 engaged in a correspondingly shaped notch 110 in the edge of the mounting plate 98 so that as the hand wheel 104 moves longitudinally of the screwthreaded member 108, the mounting plate 98 will be caused to reciprocate thereby adjusting the spatial relation of the lower foot 102 from the upper feet 92.

The screwthreaded member 108 is screw threaded through a threaded opening in an extension 112 on the body 68 and is received in a rotatably adapter 114 extending into an aperture 116 in a rearward extension 118 on the upper end of the body 68. A compression coil spring 120 is interposed between the upper surface of the hand wheel 104 and the undersurface of the extension 118 thereby frictionally retaining the hand wheel 104 in adjusted position. The upper surface of the extension 112 forms a lower limit for movement of the hand wheel 104 and a shoulder 122 on the body 68 forms an upward limit for the hand wheel 104 thereby limiting the range of adjustment of the lower foot 102. It is pointed out that the passage 96 which receives the mounting plate 98 has diverging side walls to enable limited swinging movement of the mounting plate 98 so that the lower foot 102 and the offset portion 100 may pivot freely to remain in alignment with the blade 80 and to enable pivotal movement of the offset portion 100 to follow the blade around substantially any curvature thus retaining the lower foot 102 in the proper relation to the blade.

The lower foot 102 includes a pair of side plate-like members 124 having the forward ends thereof integral as at 126 and having the rearward ends thereof spaced to receive the lower end of the offset portion 100 and secured thereto by a fastener 128. The lower end of the blade 80 is received between the plate-like members 124 which have their central portions outwardly bowed thus defining an oval-shaped space for receiving the blade 80. Also, the upper edges and lower edges of each of the plate-like members 124 are rounded with the end portions thereof 130 being below the central portions thereof thus forming rounded edges for engaging the undersurface of the work 12 as illustrated in FIGURE 3.

Attached to the rearward end of the extension 112 is a mounting block 132 engaged with the undersurface of the extension 112 and secured thereto as by fasteners 134. The block 132 receives horizontally disposed mounting bolt 136 which pivotally supports a supporting block 138 which terminates at its lower edge in outwardly extending flanges 140 secured to an enlarged material engaging shoe 142 by fasteners 144. Thus, by loosening the bolt 136, the angular position of the shoe 142 in relation to the reciprocating axis of the saw blade 80 may be altered. The surface of the mounting block 132 where it is associated with the block 138 is provided with degree indicating indicia 146 which may register with the side edge of a block 138 to indicate the angular position of the shoe 142 in relation to the longitudinal axis of the saw blade 80.

The shoe 142 has the rear edge thereof rounded as at 148 with the rearmost edge thereof turned as at 150. Forwardly on the shoe 142, there is provided an enlarged generally rectangular opening 152 to enable passage of the reciprocating blade 80, the offset portion 100 of the mounting plate 98 for the lower foot 102 and the upper shoes 92. The forwardmost edge of the shoe 142 is generally straight across and also upturned as at 154 thus defining the periphery of the opening 152 to reinforce the shoe. Also, the shoe 142 may have an opening 156 to provide access to the head of the screwthreaded shaft 108 to enable a screwdriver to be employed for assembling and disassembling the components as may be necessary or in lieu thereof, the threaded member 108 may be secured in place by other structural means not requiring the aperture 156.

The body 68 is provided on one side thereof with an elongated slot-like opening 158 to enable access to the set-screws 78 to enable the blade 80 to be replaced. Also, if thick material is cut, the lower foot may be elongated and a longer shank or offset portion 100 may be employed.

When the saw actuator 60 reciprocates and passes below the lower edge of the slot-like opening 158, air will be entrapped below the actuator which then acts as a piston to force air downwardly along the saw blade and through the passage areas 96 which receives the mounting blade 98 to blow dust or other material away from the saw blade to enable a guide line placed on the material 12 to be more easily followed.

By employing a foot at both the top and bottom surfaces of the material being cut, the saw will not tear either the bottom or top surface of the grain of the material being cut which is a problem when employing a conventional saber saw. In addition, the operator has full control of the saw at all times and the saw blade will be precluded from bouncing away from the material thus eliminating a chance of the saw blade jumping out of the cut which also occurs sometimes with the conventional saber saws.

The manner of placing the gears is significant in that by providing the main gear at the top of the housing and the motor pinion between the main gear and the lower or the power end of the connecting rod 50 as illustrated in FIG. 3, the teeth are always in full engagement when under load. This is accomplished by turning the saw around so that the saw cuts upwardly as illustrated which is a more effective way of cutting as the present machine has a foot on top of the material being cut. While other saber saws have a foot on top of the material being cut, they all have a wide opening around the saw so that when the top foot is tilted to a 45° angle, the saw would not strike the side of the foot. However, in the present invention, the degree shoe has a wide opening for clearance but the upper foot 92 is still against the material being cut. If it is desired to provide a machine which cuts on the downstroke, the main gear can be placed between the motive gear and the cutting tool actuator thus pushing the main gear upward under load for better engagement of gear teeth. Also, the pump action to keep the material clean is significant as is the provision of the foot on the bottom to prevent the material from bouncing away from the saw along with the provision of the foot and the mounting shank or plate therefor being pivotal for following the saw cut which maintains accurate control of the saw even when cutting in a curved path.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. A saber saw comprising a body having a vertically disposed guide therein, an actuator reciprocal in said guide, a saw blade driven by said actuator and depending below the body, an upper work engaging foot means carried by said body in adjacent relation to the saw blade for engaging the upper surface of work cut thereby, and lower working engaging foot means supported from said body adjacent the lower end of the saw blade for engaging the undersurface of work cut thereby, said lower foot means including a mounting shank disposed in trailing aligned relation to the saw blade and being freely received in the kerf formed by the saw blade, and means mounting the shank for free pivotal movement to enable the shank and the lower foot means to turn along a curved path when following the saw blade.

2. The structure as defined in claim 1 together with a work engaging shoe mounted from said body in engagement with the upper surface of work being cut, said shoe having an area substantially larger than the foot means and having a central opening therein receiving the upper foot means, saw blade and mounting shank for the lower foot means.

3. The structure as defined in claim 2 together with means mounting the shoe on the body for angular adjustment of the shoe about an axis perpendicular to the longitudinal axis of the saw blade to enable the saw blade to cut an angular cut through the work.

4. A portable saber saw comprising a portable motor having a reciprocating output assembly, a reciprocating saw blade actuator, guide means for said actuator to guide the actuator in vertical reciprocatory movement, an upper material engaging foot carried by said guide means and adapted to engage material being cut adjacent each side of the point at which the saw blade passes therethrough, and a lower foot mounted on the guide means for engaging the undersurface of material being cut adjacent the point where the saw blade passes therethrough thereby preventing the material from bouncing away from the saw during reciprocation thereof said lower foot is vertically adjustable and freely pivotal about a substantially vertical axis to enable the lower foot to be adjusted to receive different thicknesses of material and to enable the lower foot to turn in response to movement of the saw in a curved path.

5. The structure as defined in claim 4 wherein said guide means includes a tubular member, said actuator including a piston slidable in the tubular member, said tubular member having a lower end partially closed by the upper material engaging foot whereby the piston reciprocating in the tubular member forms an air pump with air being discharged downwardly through the restricted lower end of the tubular member adjacent the point at which the saw blade passes the upper material engaging foot thereby cleaning the surface area of the work adjacent the point at which the saw blade passes therethrough.

6. The structure as defined in claim 5 wherein said upper material engaging foot includes a pair of foot members disposed along the side surfaces of the saw blade in adjacent parallel relation thereto and in slightly spaced relation thereto to define air passages along both surfaces of the saw blade, the lower ends of said foot members being arcuately rounded to engage the work surface, said lower foot including upwardly facing arcuate surfaces engaging the undersurface of the work adjacent the point at which the saw blade passes therethrough for preventing tearing of the work.

7. The structure as defined in claim 4 wherein said lower foot includes a mounting shank extending along the rear edge of the saw blade and having a thickness not exceeding the saw blades for movement in the kerf formed in the work by the saw blade, said shank being freely pivotally supported and vertically adjustably mounted on the body to enable swinging movement thereof thereby enabling the mounting shank and lower foot to pivot to follow the kerf formed in the work by the reciprocating saw blade.

References Cited
UNITED STATES PATENTS

| | | | |
|---|---|---|---|
| 1,940,483 | 12/1933 | Bangser | 30—275 |
| 1,984,500 | 12/1934 | Tautz | 143—156 |
| 2,238,578 | 4/1941 | Burkeman | 145—130 |
| 2,639,737 | 5/1953 | Forsberg. | |
| 2,695,522 | 11/1954 | Papworth. | |
| 3,388,728 | 6/1968 | Riley et al. | |

DONALD R. SCHRAN, Primary Examiner

U.S. Cl. X.R.

30—275